Aug. 31, 1937.　　　　S. EVANS　　　　2,091,916
PIPE CLAMP
Filed April 27, 1936

Seth Evans
INVENTOR
BY Jesse R. Stone
ATTORNEY

Patented Aug. 31, 1937

2,091,916

UNITED STATES PATENT OFFICE 2,091,916

PIPE CLAMP

Seth Evans, Houston, Tex., assignor to Hughes Tool Company, Houston, Tex., a corporation of Texas Application April 27, 1936, Serial No. 76,509

4 Claims. (Cl. 24—19)

My invention relates to clamps to be used in securing pipe together in rigid engagement. It is adapted for use in clamping parallel pipe sections together.

It is an object of the invention to provide a clamp which is effective to secure parallel pipe sections together tightly and yet be capable of disengagement without difficulty.

I also desire that the clamp be free of lateral projections which may catch on other tools or objects.

It is also an object to provide a clamp which is adaptable for use on different sizes of pipe by simple variations in the length of the clamping strap.

Other objects will appear from the description which follows.

In the drawing herewith, Fig. 1 is a perspective view showing the clamp ready for tightening in place.

Figure 1:
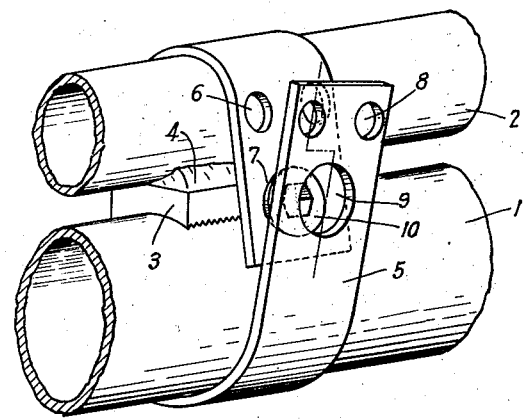

My device may be employed on pipe sections of varying diameter. It is illustrated in the drawing as securing a pipe 1 to another parallel pipe 2 of smaller diameter. The upper or smaller pipe 2 has on its lower side adjacent pipe 1, a block 3 of metal secured to pipe 2 by welding material 4, or by any equivalent means. The lower side of block 3 is concaved longitudinally to correspond approximately to the outer curvature of pipe 1 with which it engages. The concave face of block 3 is preferably serrated or toothed transversely to more effectively engage with the pipe 1.

To hold the two pipe sections together a strap 5 of metal such as steel is employed. Said strap has its ends formed with openings 6, 6 and 7 in one end and openings 8, 8 and 9 in the other overlapping end.

The opening 7 is closely adjacent the end of the strap while the two openings 6 are spaced back from the end. Also the openings 8 on the other end of the strap are spaced from the end and opening 9 is spaced back farther from the end. Thus where the strap is drawn tightly about the pipe the openings 6 and 8 will approximately register with each other and the openings 7 and 9 will be opposed one to the other.

To secure the ends together a clamping button 10 is employed. The construction of this button will be best seen in Fig. 4. It has an inner end 11 of such size as to fit closely in opening 7 of the strap. When in that position it is secured rotatably therein by a washer 12 welded to the end 11 on the inner side of the strap. There is a shoulder 13 formed on the button flush with the outer surface of the strap when the washer 12 is in position.

Figure 4:
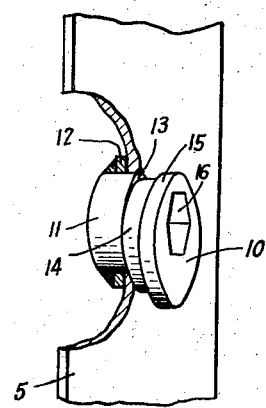
Fig. 4 is a broken perspective detail of the latch for the clamp.
Figure 5:
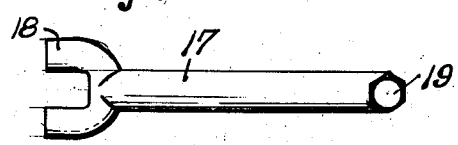
Fig. 5 is a front elevation of a wrench employed in fixing the clamp in place.

Beyond the shoulder is an eccentric area 14 of sufficient length to receive the other end of the strap and fit within the opening 9 of that end. This area 14 is of slightly larger diameter than the area 11 and the lower side is extended below that side of the area 11 as seen in Fig. 4.

Outside the area 14 is a head 15 of still larger diameter also arranged eccentrically relative to the axis of the button. The upper margin is approximately flush with the area 11, but the lower side extends farther down, as will be seen in Fig. 4. In the end of the button is a polygonal socket 16 to receive a wrench.

In operation, the button is secured in position in the opening 7 and welded to the washer 12. The strap is then tightened about the pipe so that the head 15 can project through opening 9 in the other end of the strap. To do this, a wrench 17 is employed. Said wrench has two prongs 18 to engage through openings 8 and into openings 6. The strap is then drawn tight by prying the strap ends together with the wrench as seen in Fig. 2.

Figure 2:
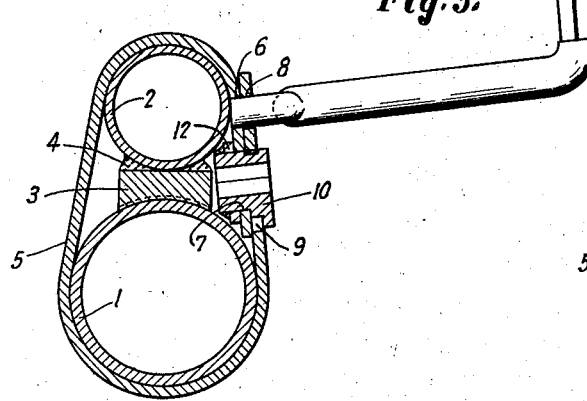
Fig. 2 is a transverse section through a clamp placed upon the pipe sections.
Figure 3:
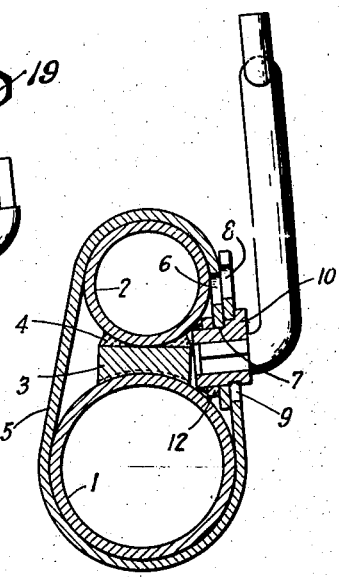
Fig. 3 is a similar section with the clamp tightened into fixed position.

With the strap in this position the head 15 of the button will project through opening 9 as seen in Fig. 2. The wrench can then be removed and the end 19 of the wrench inserted in the opening 16 of the button and the button can be rotated to the position shown in Fig. 3 with the lower portion of the head, as seen in Fig. 4, extending upwardly so that it will engage outside the strap end. The turning of the button will, because of the cam surface 14, tighten the strap to pull it securely in position and place a strain upon the strap so that it cannot slip over the head of the button. The wrench may then be removed and the clamp will be secure. It is obvious, however, that it may be released by again rotating the button of its first position shown in Fig. 4.

It is to be noted that this clamp may be easily and quickly applied, or removed. When it is in position, it presents a comparatively smooth outer surface and will not project materially from the pipe so as to be in the way, or to catch on projections.

What I claim is:

1. A pipe clamp comprising a metal strap to be engaged about adjacent parallel pipe sections with its inner and outer ends overlapping, a button secured rotatably in the inner of said overlapping ends, said outer end having an opening to receive said button, said ends being adapted to be drawn together to engage said button in said opening, an eccentric cam surface on said button engaging with said opening, and an outer head on said button adapted when said button is rotated to tighten said strap, to engage outside said opening to hold said ends together.

2. A pipe clamp comprising a metal strap to be engaged about adjacent parallel pipe sections with its inner and outer ends overlapping, a button secured rotatably in the inner of said overlapping ends, said outer end having an opening to receive said button, said ends being adapted to be drawn together to engage said button in said opening, and means to place a strain on said strap to secure said ends together responsive to the rotation of said button.

3. A pipe clamp to secure together adjacent pipe sections spaced slightly apart, a strap of metal to engage around said pipe sections with overlapping ends, a button rotatable in one of said ends, an opening in the other end to receive said button, a cam surface on said button to engage said opening and when said button is rotated, to place a strain upon said strap, and means on said button to retain said ends together.

4. A pipe clamp to secure together adjacent pipe sections spaced slightly apart, a strap of metal to engage around said pipe sections with overlapping ends, a button rotatable in one of said ends, an opening in the other end to receive said button, the opposing ends of said strap being perforated to receive a lever to tighten said strap, a cam surface on said button to engage said opening and when said button is rotated, to place a strain upon said strap, and means on said button to retain said ends together.

SETH EVANS.